Figure 1:
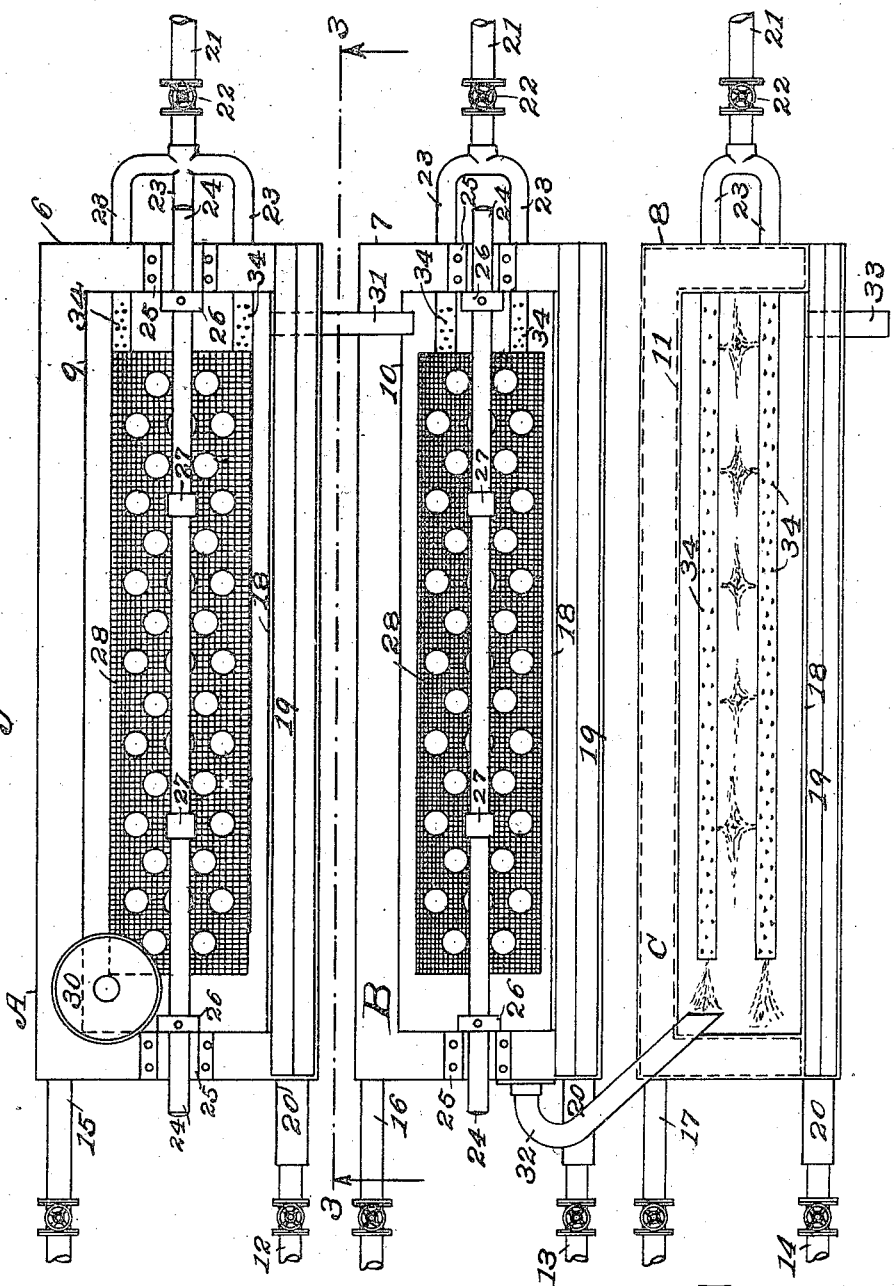

E. E. CLAUSSEN.
METHOD OF CONCENTRATING MILK.
APPLICATION FILED AUG. 8, 1908.

993,224.

Patented May 23, 1911.
2 SHEETS—SHEET 2.

Witnesses:
Fred H. Carpenter
Chas. E. Foet

Inventor:
Edward E. Claussen
By his Attorneys,
Sutherland & Anderson

UNITED STATES PATENT OFFICE.

EDWARD E. CLAUSSEN, OF HARTFORD, CONNECTICUT.

METHOD OF CONCENTRATING MILK.

993,224.  Specification of Letters Patent.  Patented May 23, 1911.

Application filed August 8, 1908. Serial No. 447,540.

*To all whom it may concern:*

Be it known that I, EDWARD E. CLAUSSEN, a citizen of the United States, residing at Hartford, in the county of Hartford and State of Connecticut, have invented certain new and useful Improvements in Methods of Concentrating Milk, of which the following is a specification.

This invention relates to a method of concentrating milk, the primary object thereof being to secure rapidity in obtaining the final product.

The invention possesses other objects which with the one stated will be set forth at length in the following description wherein is outlined fully one effective manner of practicing the method.

Any suitable apparatus may be provided for carrying the method into effect. As an example I might cite the apparatus disclosed in my copending application Serial No. 384,792 filed July 20, 1907. To practice the invention, however, I might provide apparatus wholly and radically different from that set forth in said application. In the drawings accompanying and forming part of the present specification I have represented in detail the apparatus of said copending application which will be fully described for the purpose of indicating a method involving my invention and the advantages thereof.

Figure 2:
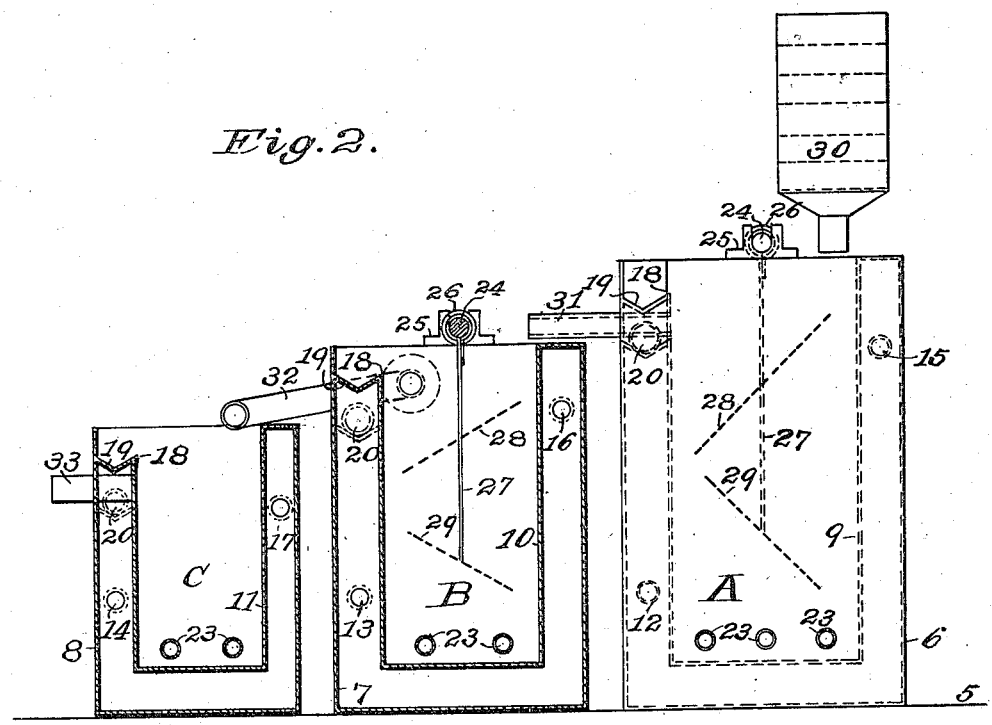
Figure 3:
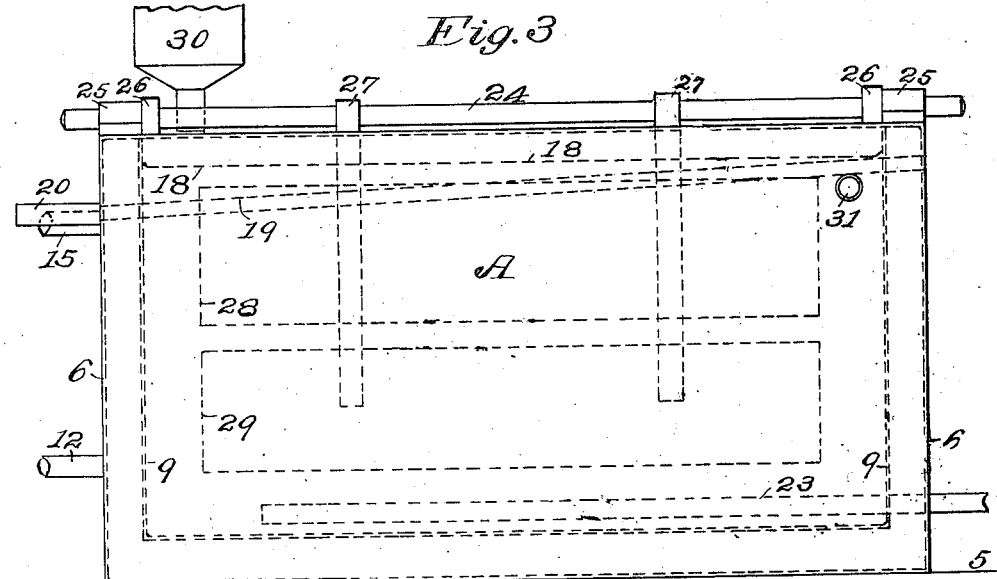

Referring to said drawings, Figure 1 is a top plan view of said apparatus. Fig. 2 is a sectional end elevation of the same, and Fig. 3 is a section on the dash and dot line 3—3, Fig. 1 looking in the direction of the arrows.

One of the more important features of the invention comprises a method which consists in causing a mass of milk to flow and in subjecting the milk to the action of a dehydrating agent at different places in its flow. While the said dehydrating agent may be of any suitable character I prefer to utilize heat and air. Hot water heat I find as best suited to my purpose and it should be preferably of such a temperature as not to coagulate the albumen in the milk or otherwise change any of the constituents thereof except of course the elimination of the water therein to obtain an excellent product. I obtain the best results by varying the temperature applied to the milk at different places in the travel thereof. Preferably I cause the milk to move and temporarily restrain the milk while in transit to form separated bodies and subject these bodies to progressively varying temperatures, for instance the maximum heat may be applied to the first body of milk, the next lower heat to the next body and so on assuming that there are more than two bodies although the number thereof is not a matter of consequence. By causing the movement of the milk I insure continuity of process and naturally obtain the concentrate in a relatively short time; the result in question is augmented by the manner in which the heat is applied. By subjecting the milk to progressively decreasing degrees of heat I avoid the possibility of the milk being scorched or burned or otherwise injuriously affected. I prefer also to aerate the milk, for example by injecting compressed air into the independent bodies thereof. This results in aiding the heat in that the air passed into the milk, it being understood of course that the same finds a way to atmosphere, absorbs the moisture in the milk. It is conceivable that the pressure of air supplied to the several bodies might be uniform but preferably it is variable, commencing with the first body at the low pressure and increasing as the consistence of the milk increases. I have set forth in a general way some of the more important features of my method and the apparatus to which allusion has been made is provided with means for carrying into effect the complete method. It is apparent, however, that all the features of the method need not be practiced at one time. As an illustration I might subject the milk to the action of the dehydrating agent without aerating the same and vice versa.

The apparatus represented involves three receptacles as A, B and C, resting on a floor or other foundation as 5 and consisting respectively of tanks 6 and 9, 7 and 10 and 8 and 11. The tank 9 is inclosed in the tank 6, the tank 10 in the tank 7 and the tank 11 in the tank 8. The several inner tanks depend in the several outer tanks and are separated therefrom except at the tops where they are connected by webs so as to present inclosed hot water spaces. Hot water may be supplied to the several hot water spaces by supply pipes as 12, 13 and 14 and can pass therefrom by way of discharge pipes as 15, 16 and 17 by virtue of which the several inner tanks 9, 10 and 11 may be heated and maintained at the requisite temperature.

While I do not limit myself to the application of any particular degree of heat I prefer that it be such as will not change chemically the milk. The heat applied to the milk in the initial tank 9 is approximately 150 degrees Fahrenheit, while the heat applied to the milk in the tanks 10 and 11 is substantially 120 and 90 degrees Fahrenheit, respectively. Each inner tank has one wall at a less height than the others to provide an overflow edge denoted by 18 in each instance, and located adjacent thereto is a trough as 19 connecting each inner tank with the companion outer tank. This trough of each receptacle constitutes part of the web uniting the two tanks thereof, and leading from the same is a discharge pipe as 20.

Air supply pipes are shown at 21 and these communicate with a suitable source or sources of air pressure the latter depending upon whether the milk is subjected to different amounts of pressure at different places in its travel. I prefer as it is believed will be apparent to progressively increase the pressure, the milk in the tank 9 being subjected to the lowest pressure, the milk in the tank 10 to a higher pressure, and that in the tank 11 to the highest pressure. The pipes 21 may be provided with hand valves as 22 for controlling the supply of air to the respective inner tanks and in addition thereto with branches as 23 extending through one wall of each of the tanks of said three receptacles and along and near the bottom of the inner tanks. Said branch pipes within the several inner tanks have innumerable air jet discharge apertures 34 by which air may be discharged in all directions by reason of which an innumerable number of very fine or needle-like jets of air can be forced into and through the milk to keep the same in a violent state of agitation. The supply of air is preferably continuous and the air laden with moisture taken from the milk passes out the open tops of the several receptacles into the atmosphere.

In conjunction with the receptacles A and B, I may provide rods as 24, supported by bearings as 25, on the ends of said receptacles at the top thereof and held in place by collars as 26. Fastened to and depending from the rods 24 are metallic strips 27 located in the inner tanks 9 and 10 and to which are attached screens as 28 and 29 set at angles to each other and having innumerable apertures. The air bubbles rising in the milk below the screens strike the latter and are further broken into smaller bubbles by such means which also effect the separation of the milk particles from the bubbles.

A filter is shown at 30 and it is located at a convenient place over the receptacle A, the largest one of the group. The milk is continuously pumped into said filter in any desirable manner and is separated while in said filter from the foreign matter usually present therein. The milk passes from the filter into receptacle A and from the latter by way of the pipe 31 into the receptacle B. The milk passes from the receptacle B to the receptacle C through the discharge pipe 32 while the concentrated milk passes from the final receptacle through the discharge pipe 33, it being understood that the milk while in said receptacles is contained respectively in the tanks 9, 10 and 11 thereof, which tanks as will be clear are of varying or different capacities, the tank 9 being the largest, the tank 10 the next in size and the tank 11 the smallest.

In carrying my method into effect with apparatus such as that hereinbefore described, the following procedure may be adopted. Milk freed from all impurities is discharged continuously by the filter into the tank 9. While the milk is in said tank 9 it will be heated by a circulating body of water heated preferably to the temperature hereinbefore set forth and which enters the space around said tank 9 by the pipe 12 and leaves such space by the pipe 15 located at a higher level. When the milk fills the tank 9 it flows into the tank 10 where it is again subjected to the action of hot water heat but at a lower temperature, the hot water being at a lower temperature as will be obvious. The milk supplied as will be obvious. The milk passes from the tank 10 to the tank 11 where it is further heated, the heat applied being the minimum. The concentrated milk is drawn off from the tank 11 by the pipe 33. The three tanks form the milk into separated and distinct bodies although they do not interrupt materially the continuity of the milk and these three bodies owing to the different capacities of the containing tanks are variable, preferably being of progressively decreasing size although they progressively increase in concentration owing to the elimination of water. By varying the size of the bodies of milk I avoid possibility of the same being burned or scorched.

During the time the milk is being heated in the manner set forth I may introduce thereinto compressed air as previously described. This is not essential, however, as the air might be injected into the milk after the latter had been heated and before it becomes cool or afterward or even before the heat is applied.

The injection of air into the milk sometimes causes foaming at the surface thereof. This foam can be easily disposed of by the apparatus illustrated, the troughs 19 being provided for this purpose. The foam which may collect on the milk in the several receptacles will flow over the overflow edges 18 into said troughs 19 and will pass therefrom into the several discharge pipes 20 where it is disposed of as desired.

While continuity in carrying the process or method into effect is a desideratum, it is not wholly essential as the milk may be subjected to variable degrees of heat and also to variable pressures alone or together while in a state of rest or substantially so. In this case only one receptacle need be used, such as the receptacle A.

What I claim is:

1. A method of concentrating milk which consists in causing the milk to flow, forming the milk into separate bodies at different points in its flow, and in subjecting said bodies to the action of both heat and compressed air without stopping the flow of the milk and without coagulating the albumen therein, the heat applied to the different bodies varying and the pressures of air applied to the different bodies also varying.

2. A method of concentrating milk which consists in subjecting the milk to heat of progressively decreasing temperatures and in also passing air at progressively decreasing pressures through the milk.

In testimony whereof I affix my signature in presence of two witnesses.

EDWARD E. CLAUSSEN.

Witnesses:
ARTHUR L. SAMPSON,
GEORGE MORTSON.